United States Patent
Kaneko

[19]
[11] Patent Number: 6,113,254
[45] Date of Patent: Sep. 5, 2000

[54] VEHICLE LAMP

[75] Inventor: Susumu Kaneko, Shizuoka, Japan

[73] Assignee: Koito Manufacturing Co., Ltd., Tokyo, Japan

[21] Appl. No.: 09/152,057

[22] Filed: Sep. 11, 1998

[30] Foreign Application Priority Data

Sep. 12, 1997 [JP] Japan .................................. 9-248084

[51] Int. Cl.⁷ .................................................. F21V 5/00
[52] U.S. Cl. .......................... 362/520; 362/509; 362/522
[58] Field of Search ................................. 362/518, 516, 362/509, 520, 522, 543, 545, 544, 510, 360, 361, 307, 311

[56] References Cited

U.S. PATENT DOCUMENTS

| | | | |
|---|---|---|---|
| 4,855,877 | 8/1989 | Otaka | 362/509 |
| 5,081,564 | 1/1992 | Mizoguchi | 362/521 |
| 5,084,805 | 1/1992 | Goto | 362/510 |
| 5,455,747 | 10/1995 | Aoyama | 362/545 |
| 5,552,969 | 9/1996 | Murakami | 362/520 |
| 5,642,228 | 6/1997 | Takezawa et al. | 359/642 |

*Primary Examiner*—Sandra O'Shea
*Assistant Examiner*—Hargobind S Sawhney
*Attorney, Agent, or Firm*—Morgan, Lewis & Bockius LLP

[57] ABSTRACT

A vehicle lamp including a lamp body having a front opening and an armoring lens attached to the front opening of the lamp body, the armoring lens including at least a first lens and a second lens each having different colors. The first lens has a front surface, a side surface, a seal leg portion configured for attachment to the lamp body and an extended portion formed on an outer surface of the seal leg portion. The second lens wraps around the first lens to contact the front surface and the side surface of the first lens and has an outer end surface that abuts the extended portion.

13 Claims, 4 Drawing Sheets

VEHICLE LAMP

This application claims the benefit of Application No. Hei. 9-248084, filed in Japan on Sep. 12, 1997, which is hereby incorporated by reference.

BACKGROUND OF THE INVENTION

1. Field of the Invention

The present invention relates to a vehicle lamp and, more particularly, to a vehicle lamp having an armoring lens attached to a lamp body.

2. Discussion of the Related Art

In a lamp for a vehicle such as a car, an armoring lens is attached to a front opening portion of a lamp body. The armoring lens comprises a red lens formed from a translucent resin for a tail lamp, a white lens for a back lamp, etc. To manufacture such an armoring lens, lenses of a plurality of colors are integrally molded together. In an exemplary conventional manufacturing method, after injection molding a white lens, the white lens is moved into another mold having a cavity for molding a red lens, thereby integrating both the lenses with each other during the injection molding of the red lens. In a simultaneous multicolor molding system in which after injection molding of a white lens, only an upper mold is replaced by another upper mold having a cavity for molding a red lens. This process can be further repeated for other colors of the lens. Configuration is made such that the laminate portions of both the above-mentioned lenses are molded simultaneously at the time of injection molding in which both the lenses are integrated with each other.

A conventional armoring lens thus molded is shown in FIGS. 6 and 7. Here, an armoring lens a is to be attached to the whole opening portion of a lamp body. The armoring lens comprises a second red lens c laminated on the upper surface of the outer circumferential edge of a first white lens b.

However, in a vehicle lamp having such a structure, particularly in such an armoring lens, for example, as shown in FIG. 6, the area for the joint portion in the laminate portion of the first lens b and the second lens c can not be made large, so that the bonding strength (or joining strength) is low. In addition, because a joint end surface d of the laminate portion is exposed, rainwater and other objects directly contact the joint end surface d, thereby causing the second lens c to separate.

In contrast, in an armoring lens shown in FIG. 7, an outer edge portion e of the second lens c that wraps around from the upper surface to the outer surface of the first lens b is formed so as to be elongated depthwise. Accordingly, while it is possible to ensure necessary joining strength, only the outer edge portion e is observed as a deep and dark portion when the lens is viewed from its front side, so that the external appearance of the lens is poor. In addition, a joint end surface d in the laminate portion is exposed similarly to the case of FIG. 6, so that separation is caused in the second lens c.

SUMMARY OF THE INVENTION

Accordingly, the present invention is directed to a vehicle lamp that substantially obviates one or more of the problems due to limitations and disadvantages of the related art.

An object of the present invention is to provide a vehicle lamp with increased bonding strength between a laminate portion of first lens and a second lens near the outer circumferential edge of an armoring lens.

Another object of the present invention is to provide an armoring lens having a good external appearance.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the vehicle lamp includes a lamp body having a front opening and an armoring lens attached to the front opening of the lamp body, the armoring lens including at least a first lens and a second lens each having different colors. The first lens has a front surface, a side surface, a seal leg portion configured for attachment to the lamp body and an extended portion formed on an outer surface of the first lens of the seal leg portion. The second lens wraps around the first lens to contact the front surface and the side surface of the first lens and has an outer end surface that abuts the extended portion.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

According to the present invention, a vehicle lamp comprises a lamp body, an armoring lens attached to a front opening portion of the lamp body, and a bulb disposed in the lamp body. The armoring lens is formed of two kinds of lenses, each having a different color. The lenses are laminated by molding in an outer circumferential edge portion of the armoring lens. The two kinds of lenses include a first lens having a seal leg portion to be attached to the lamp body, and a second lens laminated by molding in a roundabout way over front and side surfaces of an outer circumferential edge of the first lens. That is, the second lens wraps around the front surface to the side surface of the first lens. Also, the first lens has a relatively thick or swollen portion which may have an inclined surface formed on an outer surface of the seal leg portion of the first lens so that an outer end surface of the second lens is joined to the swollen portion. Reference to the term "front" herein generally corresponds to the light projecting direction of the lamp.

Accordingly, separation between the first and second lenses is prevented, and the bonding strength between the first and second lenses is increased. Further, the lamp has a good external appearance.

Figure 1:
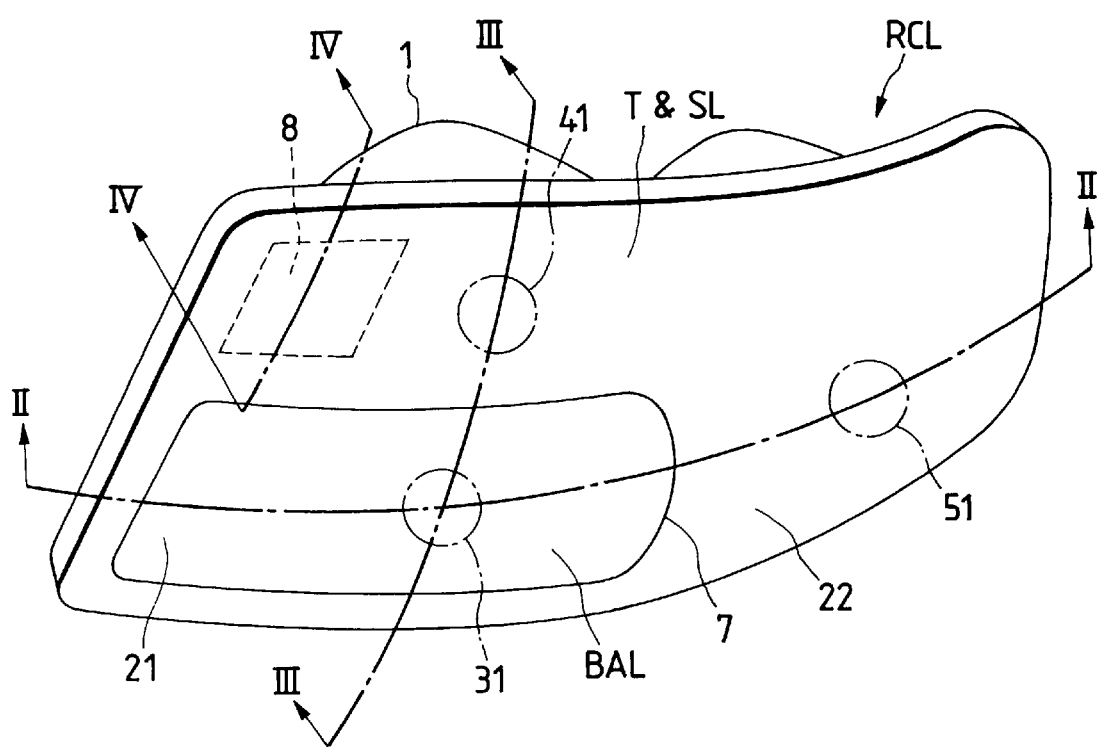
FIG. 1 is a front view of the vehicle lamp according an embodiment to the present invention.
Figure 2:
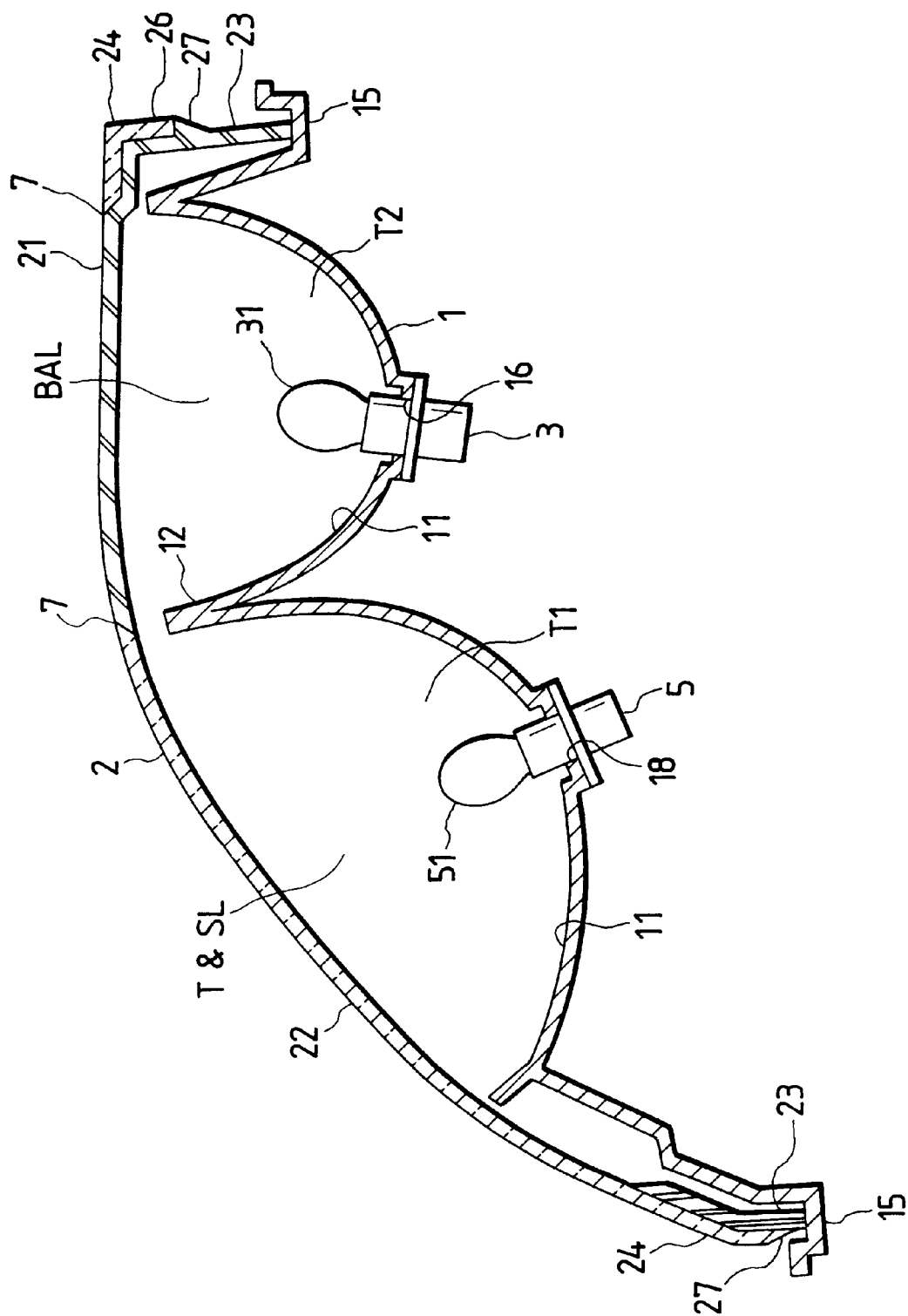
FIG. 2, is a sectional view taken on line II—II in FIG. 1.
Figure 3:
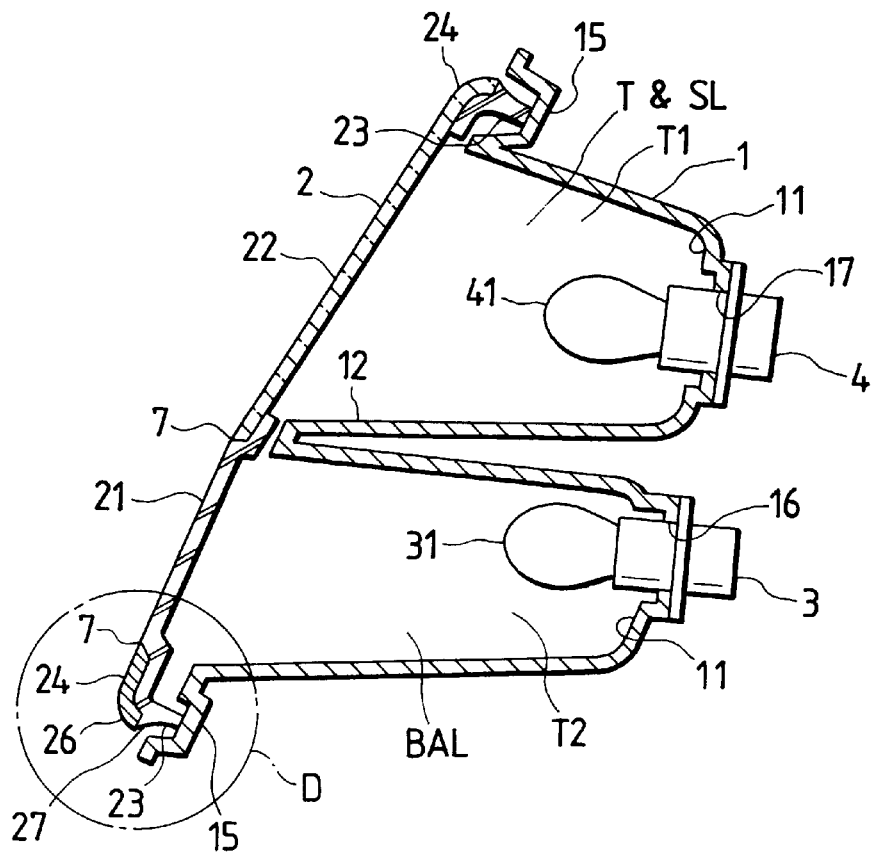
FIG. 3 is a sectional view taken on line III—III in FIG. 1.
Figure 4:
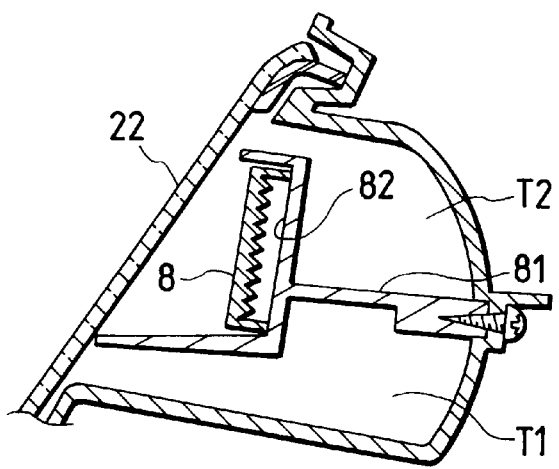
FIG. 4 is a sectional view taken on line IV—IV in FIG. 1.
Figure 5:
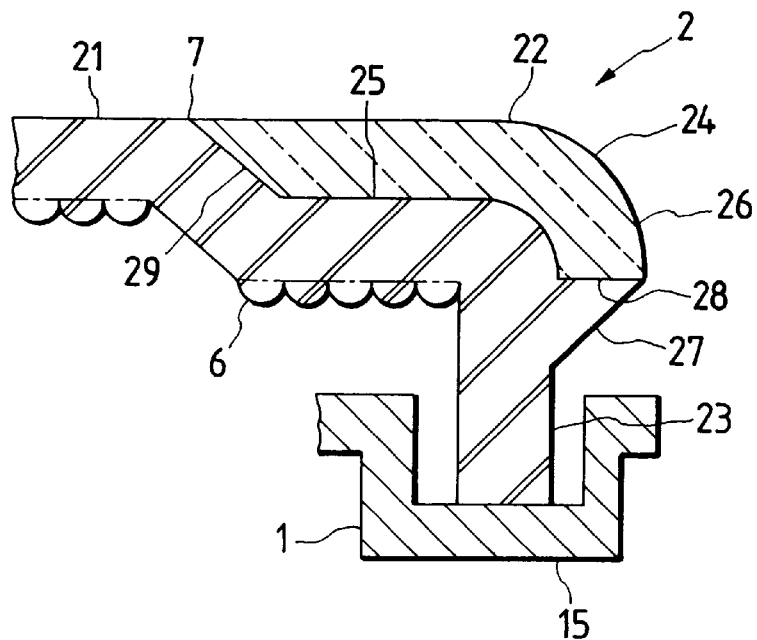
FIG. 5 is an enlarged view of a portion D in FIG. 3.
Figure 6:
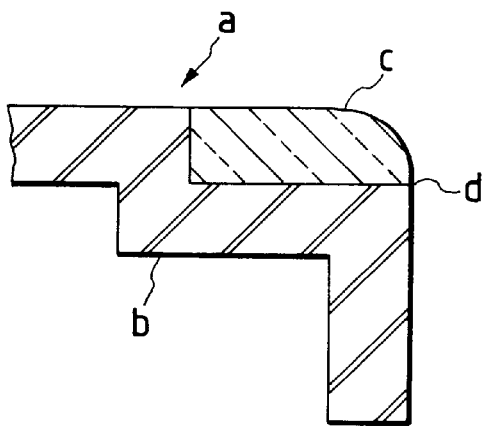
FIGS. 6 and 7 are sectional views showing different examples of a conventional lamp.
Figure 7:
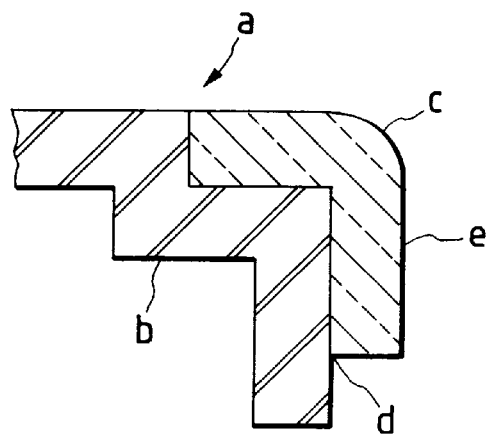

An embodiment of a vehicle lamp according to the present invention will now be described in detail with reference to FIGS. 1–5. Specifically, FIG. 1 is a front view of a vehicle lamp embodied as a rear combination lamp for a car. FIG. 2 is a sectional view taken along line II—II of FIG. 1. FIG. 3 is a sectional view taken along line III—III of FIG. 1. FIG. 4 is a sectional view taken along line IV—IV of FIG. 1. FIG. 5 is an enlarged view of portion D of FIG. 3.

In this rear combination lamp (RCL), a tail and stop lamp (T&SL) is formed in the upper portion, and a back lamp (backup light BAL) is formed in the lower portion.

The vehicle lamp comprises a lamp body 1 and an armoring lens 2. The lamp body 1 is formed of a synthetic resin. The inner surface of the lamp body 1 is formed as a reflective surface 11 by evaporation or application of metallic material such as aluminum or the like. In addition, a partition wall 12 is formed in the lamp body 1, thereby separating the inside of the lamp body 1 into right/left and upper/lower portions so as to form lamp chambers T1 and T2 for the tail and stop lamp T&SL and the back lamp BAL respectively. Further, in the outer circumferential edge of the lamp body 1, a seal groove 15 is formed along the front opening portion of the lamp body 1. The armoring lens 2, which will be described later in detail, is attached to the seal groove 15. Specifically, a seal leg portion 23 of a first lens 21 is brought into contact with the upper surface of this seal groove 15, and the whole circumference of the seal leg portion 23 is welded and fixed to the upper surface of the seal groove 15 using a welding technique such as vibration welding, ultrasonic welding, hot plate welding, or the like.

In addition, in the back surface of the lamp body 1, bulb attachment holes 16, 17 and 18 are formed so as to face the above-mentioned lamp chambers T1 and T2 for the respective lamps. Bulb sockets 3, 4 and 5 for which bulbs 31, 41 and 51 are attached are mounted in these bulb attachment holes 16, 17 and 18. Here, the bulbs 31, 41 and 51 will act as light sources for the respective lamps of lamp chambers T1 and T2.

This armoring lens 2 comprises a first white lens 21 for the portion corresponding to the back lamp BAL, and a second red lens 22 for the portion corresponding to the tail and stop lamp T&SL. This second lens 22 is formed so as to surround the first lens 21 according to an insert system, a simultaneous multi-color molding system, or the like. In a border portion 7 of the surrounding portion, the first lens 21 and the second lens 22 are laminated. In addition, the first lens 21 and the second lens 22 are laminated also on an outer circumferential edge 24 of this armoring lens 2. Specifically, as shown in FIG. 5, the second lens 22 is laminated on the first lens 21 so as to cover a recess portion 25 formed on the upper (front) surface of the outer circumferential edge of the first lens 21. That is, the outer surfaces of the first lens 21 and the second lens 22 are even to form one smooth plane without a step. Further, the second lens 22 has a laminate portion 26 formed around and covering the outer circumferential edge side portion (or rounded cover portion) of the first lens 21.

A seal leg portion 23 is formed in the lower portion of the outer circumferential edge of the first lens 21 so that the seal leg portion 23 is fixed in the seal groove 15 formed in the lamp body 1. Further, a relatively thick or swollen portion 27 having a substantially triangular section is formed on the outer surface of the seal leg portion 23. An outer end surface 28 of the laminate portion 26 of the second lens 22 is brought into contact and joined with the upper flat surface portion of this swollen portion 27. In addition, an inner edge portion 29 of the laminate portion 26 is formed into a slope which is brought into contact and joined with the slope of the inner surface of the recess portion 25 formed in the first lens 21. A prism structure 6 for controlling light of the bulb 31 is formed in the inner surface of the first lens 21. In such a manner, when the border portion 7 is observed by eyes from its front side, light is diffused and reflected irregularly by the prism 6 so that the red of the second lens 22 in the border portion 7 is recognized as uniform color with no shade. Accordingly, a good external appearance is provided.

In FIG. 4, a recursive reflector 8 reflects light from a head light or the like of a following car. The recursive reflector 8 is fixed horizontally on a support surface 82 of a support member 81 fixed by a suitable means such as a screw or the like to the lamp chamber T2 constituted by the second lens 22. In such a manner, at night, the recursive reflector 8 reflects light emitted from the head light of a following car and passed through the second lens 22, thereby enabling the following car to confirm the existence of the vehicle.

According to this configuration, the second lens 22 is laminated on the first lens 21 with the whole of the outer circumferential edge portion of the first lens 21 covered. Accordingly, the bonding area can be made large, thereby allowing the bonding force to be increased. In addition, the outer end surface 28 of the laminate portion 26 of the roundabout portion of the second lens 22 is brought into contact and joined with the swollen portion 27 formed on the outer side of the seal leg portion 23 of the first lens 21. Accordingly, there is no fear that the joint end surface is exposed, thereby preventing separation of the second lens 22 from the joint portion.

Further, the laminate portion 26 of the roundabout portion is configured to abut against the relatively thick or swollen portion 27 so that it is not necessary to elongate the length in the depth direction of the roundabout portion in order to ensure the joining force. Therefore, even if the second lens 22 is observed by eyes from its front side, the red color of the laminate portion 26 will not be thicker than that in the surrounding of the laminate portion 26, which would cause the external appearance of the lamp to be poor. In addition, at the border portion 7 between the first lens 21 and the second lens 22 surrounding the first lens 21, the lenses 21 and 22 are joined with each other on their slopes, so that the thickness of the second lens 22 is changed gradually as a portion of the second lens 22 approaches the border portion 7 between the first lens 21 and the second lens 22. Particularly, the shading of the red of the second lens 22 is therefore inconspicuous, thereby improving the external appearance of the lamp.

Although the embodiment has been described about an example in which the present invention is applied to a combination lamp constituted by a tail and stop lamp and a back lamp, the invention may be applied to a combination lamp having another configuration. Even in a lamp having an independent configuration, similar effects can be obtained by applying the present invention into a structure in which, on the outer circumferential edge of a required lens, another lens different in color is laminated.

The armoring lens according to the present invention is constituted by a first lens having a seal leg portion to be attached to the lamp body, and a second lens laminated by molding so as to form a roundabout way (i.e., the second lens extends around a corner portion of the first lens) over top and side surfaces of an outer circumferential edge of the first lens, the first lens having a swollen portion formed on an outer surface of the seal leg portion of the first lens so that an outer end surface of the second lens is joined to the relatively thick or swollen portion. Accordingly, the joined end surface of the laminate portion will not be exposed to the outside. Therefore, not only it is possible to increase the bonding strength, but also it is possible to prevent separation of the second lens from the joint portion.

Even when the first lens is formed from white translucent resin and the second lens is formed from chromatic translucent resin, it is possible to reduce the length of the roundabout portion (i.e., the portion of the second lens traversing the corner portion of the first lens) of the second lens in the laminate portion. Accordingly, the shading is inconspicuous in the color of the second lens, when the second lens is viewed from its front side. Therefore, there is an effect to improve the external appearance of the lamp.

The second lens laminated on the first lens is joined with the first lens such that the slope formed on the inner edge is made to be a boundary between the first and second lenses, and the thickness of the second lens is made to change gradually as a portion of the second lens approaches the border portion. Therefore, the shading of the color of the second lens is inconspicuous in the border portion. Further, because a prism is formed in the inner surface of the first lens which is the joint portion, light is reflected irregularly by the prism, so that the shading of the color of the second lens is diluted in the border portion. Accordingly, a good external appearance of the lamp is achieved.

In addition, with the above-mentioned configuration, it is possible to increase the strength of the laminate portion of the first lens and the second lens. Accordingly, there is an effect that even if vibration welding or ultrasonic welding is used, the seal leg portion of the first lens can be fixed to the seal groove formed in the outer circumferential edge of the lamp body without producing any displacement or separation in the laminated lenses due to very small vibrations of the welding, and there is no fear the separation of the laminate portion is caused at the time of processing on the lens.

According to one embodiment, the lamp has in which a plurality of lamp chambers therein. The first lens and the second lens are disposed to correspond to the respective lamp chambers. Thus, the above-mentioned effects can be achieved by laminating one of the respective lenses on the other lens to surround the outer circumferential edge of the other lens.

It will be apparent to those skilled in the art that various modifications and variations can be made in the vehicle lamp of the present invention without departing from the spirit or scope of the invention. Thus, it is intended that the present invention cover the modifications and variations of this invention provided they come within the scope of the appended claims and their equivalents.

What is claimed is:

1. A vehicle lamp, comprising:
   a lamp body having a front opening;
   a bulb disposed in the lamp body; and
   an armoring lens attached to the front opening of the lamp body, the armoring lens including at least a first lens and a second lens each having different colors;
   wherein the first lens has a front surface, a side surface, a seal leg portion configured for attachment to the lamp body, and an extended portion formed on an outer surface of the seal leg portion, and
   wherein the second lens wraps around the first lens to contact the front surface and the side surface of the first lens, the second lens having an outer end surface that abuts the extended portion.

2. The vehicle lamp according to claim 1, wherein the first and second lens are laminated by molding.

3. The vehicle lamp according to claim 1, wherein the first lens includes white translucent resin and the second lens includes chromatic translucent resin.

4. The vehicle lamp according to claim 1, wherein the first lens includes a sloped surface at a border portion between the first and second lenses.

5. The vehicle lamp according to claim 4, wherein the first lens includes a prism structure, for refracting or diffusing light, formed on an inner surface of the first lens at a position proximate the border portion.

6. The vehicle lamp according to claim 1, wherein the seal leg portion of the first lens is configured to be fixed to a seal groove in an outer circumferential edge of the lamp body by one of vibration welding and ultrasonic welding.

7. The vehicle lamp according to claim 1, wherein the lamp body includes at least first and second lamp chambers, and wherein the first and second lenses respectively correspond to the first and second lamp chambers.

8. A vehicle lamp, comprising:
   a lamp body having a front opening; and
   an armoring lens coupled to the front opening of the lamp body, the armoring lens comprising a first lens having a first color and a second lens having a second color, the second lens comprising a front surface covering at least a portion of a front surface of the first lens, a side surface covering at least a portion of a side surface of the first lens, and a corner portion joining the front and side surfaces of the second lens and covering a corner portion of the first lens, wherein the front surfaces of the first and second lenses are substantially flush at a position where the front surfaces meet as are the side surfaces of the first and second lenses at a position where the side surfaces meet.

9. The vehicle lamp according to claim 8, wherein the front surface of the first lens includes a portion that is angled with respect to the front surface of armoring lens at the position where the front surfaces of the first and second lenses meet.

10. The vehicle lamp according to claim 8, wherein at least one of the front surfaces of the first and second lenses includes a portion that is angled with respect to the front surface of armoring lens at the position where the front surfaces of the first and second lenses meet.

11. The vehicle lamp according to claim 8, wherein the side surface of the first lens includes a portion that is angled with respect to the side surface of the second lens direction at the position where the side surfaces of the first and second lenses meet.

12. The vehicle lamp according to claim 8, wherein at least one of the side surfaces of the first and second lenses includes a portion that is angled with respect to the other one of the side surfaces of the first and second lenses at the position where the side surfaces of the first and second lenses meet.

13. The vehicle lamp according to claim 8, wherein the side surface of the first lens is substantially thicker than elsewhere at the position where the first and second lenses meet.

* * * * *